(12) United States Patent
Hopperstad et al.

(10) Patent No.: US 8,205,711 B2
(45) Date of Patent: Jun. 26, 2012

(54) SEISMIC SOURCE ARRAYS

(75) Inventors: Jon-Fredrik Hopperstad, Oslo (NO); Johan-Fredrik Synnevaag, Oslo (NO); Pieter Leonard Vermeer, Nesoeya (NO)

(73) Assignee: WesternGeco L.L.C., Houston, TX (US)

( * ) Notice: Subject to any disclaimer, the term of this patent is extended or adjusted under 35 U.S.C. 154(b) by 1032 days.

(21) Appl. No.: 10/239,443

(22) PCT Filed: Mar. 9, 2001

(86) PCT No.: PCT/IB01/00370
§ 371 (c)(1),
(2), (4) Date: Feb. 19, 2003

(87) PCT Pub. No.: WO01/71385
PCT Pub. Date: Sep. 27, 2001

(65) Prior Publication Data
US 2003/0168277 A1 Sep. 11, 2003

(30) Foreign Application Priority Data
Mar. 23, 2000 (GB) .................... 0007034.2

(51) Int. Cl.
G01V 1/02 (2006.01)
G01V 1/38 (2006.01)
G01V 1/00 (2006.01)
G01V 1/04 (2006.01)

(52) U.S. Cl. ......... 181/111; 181/110; 181/118; 181/120

(58) Field of Classification Search .......... 181/111, 181/108, 104, 107, 110, 113, 118, 120; 367/20, 367/23, 117, 141
See application file for complete search history.

(56) References Cited

U.S. PATENT DOCUMENTS

| | | | | |
|---|---|---|---|---|
| 3,472,334 A * | 10/1969 | Snodgrass | | 367/61 |
| 3,491,848 A * | 1/1970 | Giles | | 367/17 |
| 4,048,612 A * | 9/1977 | Lawyer | | 367/56 |
| 4,207,619 A * | 6/1980 | Klaveness | | 367/36 |
| 4,486,864 A * | 12/1984 | Ongkiehong et al. | | 367/23 |
| 4,648,080 A | 3/1987 | Hargreaves | | |
| 4,658,384 A | 4/1987 | Dragoset, Jr. et al. | | |
| 4,862,422 A | 8/1989 | Brac | | |
| 4,955,952 A | 9/1990 | Williams et al. | | |
| 4,960,183 A | 10/1990 | Young, II | | |
| 5,142,498 A * | 8/1992 | Duren | | 367/15 |
| 5,281,773 A | 1/1994 | Duren | | |
| 6,288,975 B1 * | 9/2001 | Frederick et al. | | 367/149 |
| 6,747,915 B2 * | 6/2004 | Calvert | | 367/46 |

FOREIGN PATENT DOCUMENTS

| | | |
|---|---|---|
| EP | 03813367 | 8/1990 |
| FR | 2774775 A1 * | 8/1999 |
| GB | 2249177 | 4/1992 |
| WO | WO92/11546 | 7/1992 |

OTHER PUBLICATIONS

US Statutory Invention Registration H656 Jul. 4, 1989, Huizer et al.*

* cited by examiner

Primary Examiner — Edgardo San Martin

(57) ABSTRACT

A seismic source array 15 comprises a plurality of seismic source 26 arranged about a central point of the source array 15 in such a way that an imaginary circle drawn with said central point at its center, and containing all of said seismic sources 26, can be divided into at least three whole sectors each of which contains a substantially identical arrangement of seismic sources 26.

37 Claims, 19 Drawing Sheets

Azimuth

Take-off angle

- — · · — 30° vertical, 0° azimuth
- · · · · 30° vertical, 45° azimuth
- — — 30° vertical, 90° azimuth
- — · — 30° vertical, 135° azimuth
- —— 30° vertical, 180° azimuth

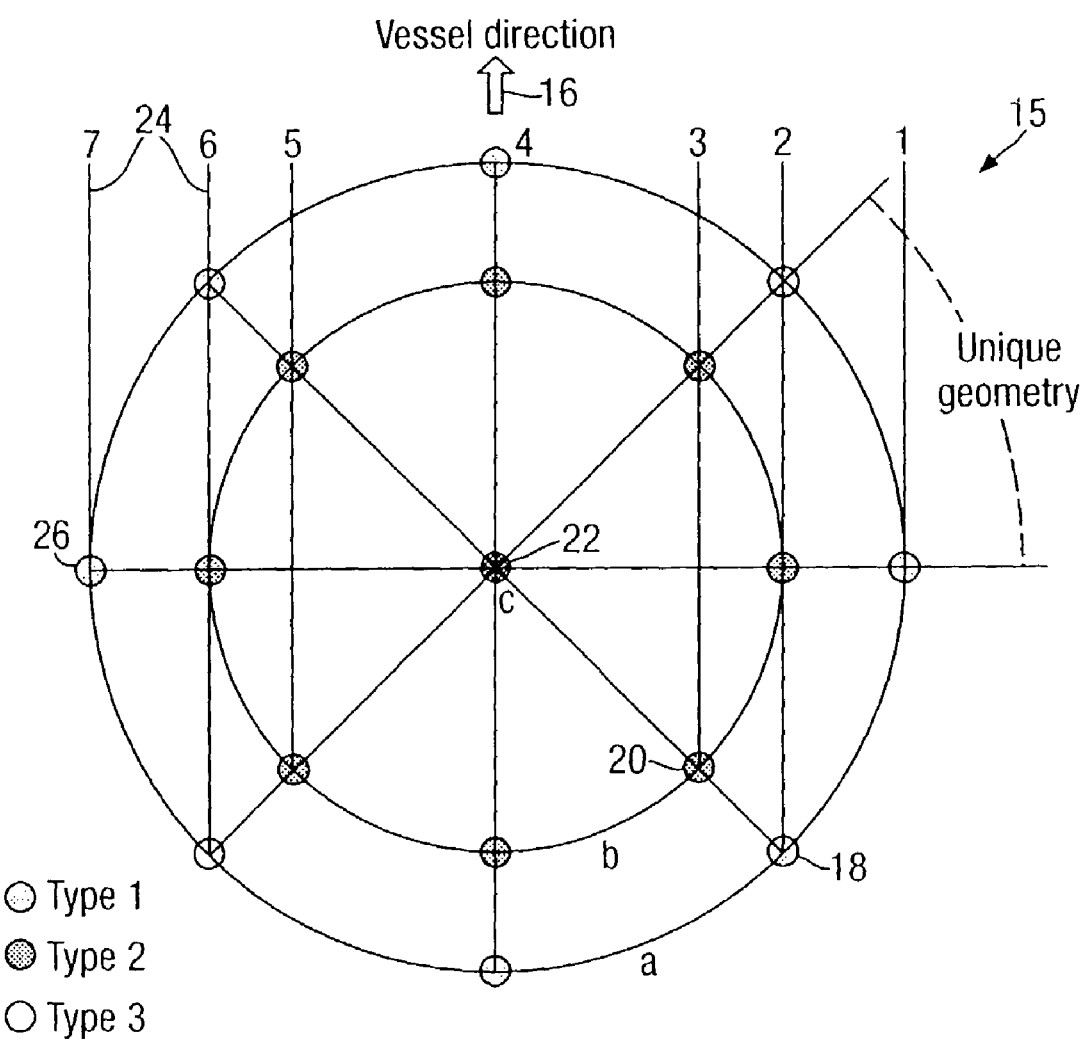

··· 30° vertical, 0° azimuth
---- 30° vertical, 45° azimuth
--- 30° vertical, 90° azimuth
··- 30° vertical, 135° azimuth
— 30° vertical, 180° azimuth ○ Type 1
● Type 2
○ Type 3

··· 30° vertical, 0° azimuth
···· 30° vertical, 45° azimuth
— · 30° vertical, 90° azimuth
··· — 30° vertical, 135° azimuth
—— 30° vertical, 180° azimuth ··· 30° vertical, 0° azimuth
···· 30° vertical, 45° azimuth
— · 30° vertical, 90° azimuth
··· 30° vertical, 135° azimuth
—— 30° vertical, 180° azimuth

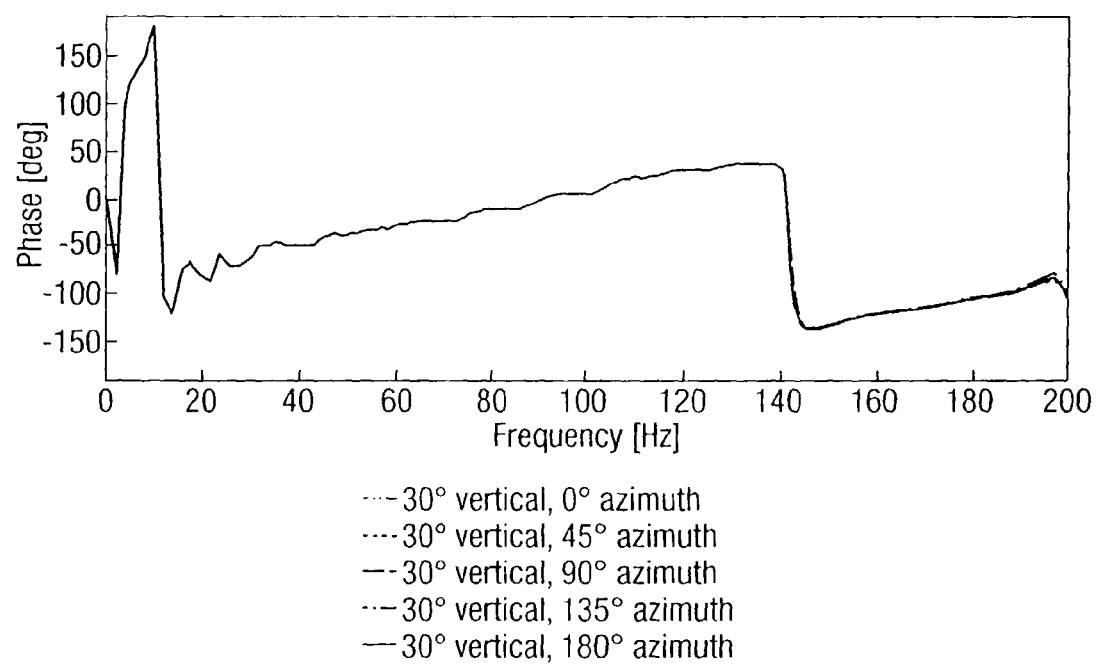

- – – 30° vertical, 0° azimuth
- ---- 30° vertical, 45° azimuth
- — - 30° vertical, 90° azimuth
- --- 30° vertical, 135° azimuth
- — 30° vertical, 180° azimuth

- ○ Type 1
- ◍ Type 2
- ◉ Type 3
- ● Type 4

--- 30° vertical, 0° azimuth
---- 30° vertical, 45° azimuth
-- 30° vertical, 90° azimuth
--- 30° vertical, 135° azimuth
— 30° vertical, 180° azimuth Fig.20.
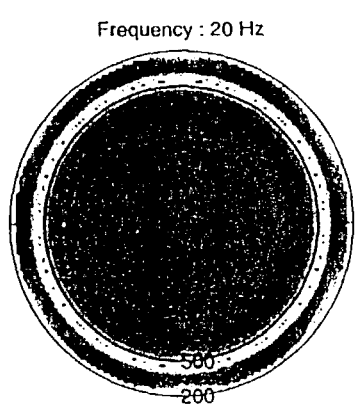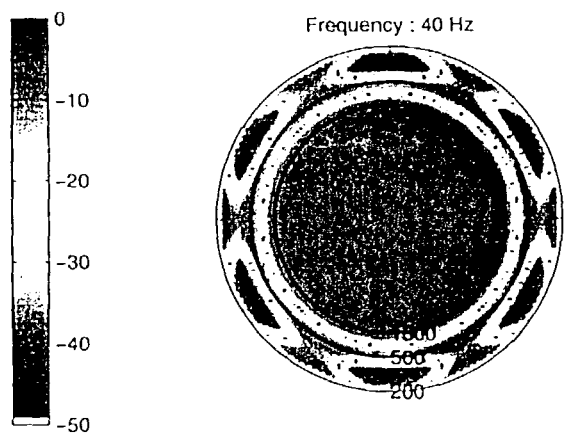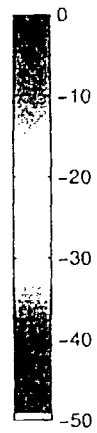
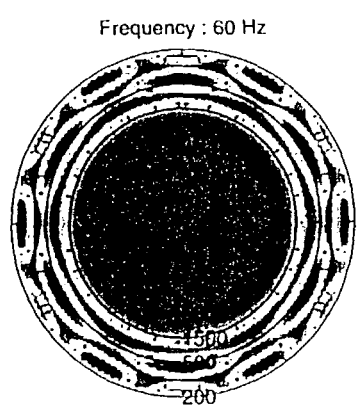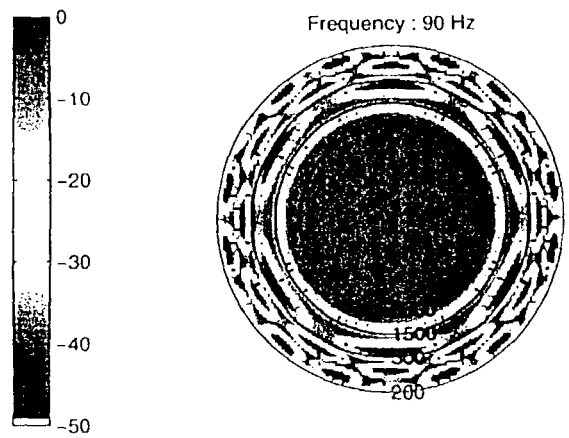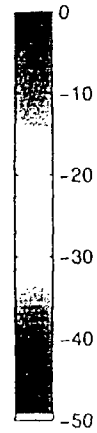

SEISMIC SOURCE ARRAYS

BACKGROUND OF THE INVENTION

1. Field of the Invention

The invention relates to seismic source arrays.

2. Description of the Related Art

Seismic data are usually acquired using arrays of seismic sources. In a source array, individual seismic sources are arranged in a certain spatial pattern. The most common marine seismic sources are airguns but also vibrators, waterguns and steam-injection guns are in use. The most common land seismic sources are vibrators and dynamite charges. Seismic source arrays are usually made up of one type of source. The sizes and strengths of the individual sources within the array may be different. In addition, the individual sources can be made to fire or start emitting at the same time or with small time delays between them.

In marine seismic surveys, the source array is usually towed by a vessel. A typical configuration is shown in FIG. 1, in which a vessel 2 tows an airgun source array 4. In land seismic surveys, a vibrator is mounted on a truck; a dynamite charge is placed in a drilled hole.

An individual source has three spatial positions: in-line, cross-line and depth. In the marine example in FIG. 1, the cross-line separation of the airguns is 8 m, the in-line separation is 3 m and their depth is 6 m.

The design of a source array amounts to the selection of the number of individual sources, their strengths, their signatures, their positions (in-line, cross-line and depth) and their firing/emission delays. The design criteria are based on the desired strength and frequency content at the geological) target depth and a desire to radiate energy principally downward.

The source arrays that are commonly used, exhibit source array directivity. This means that they do not emit the same seismic signal in all directions. The emitted signal can vary with azimuth (angle) and take-off angle. The concepts of azimuth and take-off angle are explained in FIG. 2, in which the vessel 2 and source array 4 are again shown. The present specification is only concerned with azimuth.

FIG. 3 shows the directivity pattern of the source array in FIG. 1. At frequencies 90 Hz and 130 Hz the directivity of the source array is clearly varying with azimuth. The directivity in azimuth decreases for lower frequencies as is shown at frequencies 60 Hz and 20 Hz. FIGS. 4a, b and c show the seismic signal and its amplitude and phase spectrum emitted at a take-off angle of 30° and at a range of azimuths. The change in the signal shape, its amplitude spectrum and its phase spectrum is significant.

The presence of azimuthal directivity in the seismic data is undesirable. During seismic data processing seismic data traces from different azimuths are combined to give the final image. Azimuthal directivity will have a detrimental effect: it results in a loss of resolution and a reduction of the signal-to-noise ratio.

A distinction can be made between two types of marine seismic acquisition:

(a) Sea-surface acquisition, in which a vessel tows one or more cables with built-in receivers. The receiver cables are usually towed at a depth between 3 m and 12 m. This is the most common type of acquisition and is usually referred to as towed-streamer acquisition.

(b) Sea-floor acquisition, in which the receivers are planted at the sea floor or built into a receiver cable, which is laid at the sea floor. This type of acquisition is a relatively recent development.

In both types of acquisition the sources are usually located at or near the sea-surface. The source array in FIG. 1 would be typical for both sea-surface and sea-floor acquisition.

In both types of acquisition the source vessel, which might be the same vessel that is towing the receiver cable in sea-surface acquisition, sails through the survey area and activates the source at regular intervals. In 2D acquisition a single cable (called a streamer) is towed behind the vessel, while in 3D acquisition, an array of parallel streamers, normally equally spaced apart, is towed behind the vessel.

In 3D sea-floor acquisition, the receiver cables 6 (see FIG. 5) are laid out in an area over which the source vessel 2 sails a 3D pattern. Thus, seismic data are recorded in all directions from the source 4 (see FIG. 5), that is for a full circle of azimuths: 0°-360°.

In 3D sea-surface acquisition the receiver cable 8 is usually towed behind the source vessel 2; a technique called end-on acquisition (see FIG. 6). Thus, during one sail line, the seismic data are recorded for a half-circle of azimuths −90° to +90°. In fact, because the streamer is longer (typically, 4 km to 8 km) than the cross-line offset of the outer streamers (typically, 200 m to (500 m), much of the data have an azimuth fairly close to 0°. Occasionally, receiver cables are towed both in-front-of and behind the source vessel; a technique called split-spread acquisition. Then, the seismic data are recorded for an entire circle of azimuths although much of the data have an azimuth close to either 0°, for the receiver cable behind the source vessel, or 180°, for the receiver cable ahead of the source vessel.

The source arrays that are used in sea-floor acquisition are the same as the ones used in sea-surface acquisition. These were originally designed for 2D towed-streamer acquisition in which data are only acquired straight behind the vessel at a single azimuth of 180°. The directivity in azimuth was therefore of no concern. As discussed, 3D sea-surface seismic data contain a fan of azimuths and 3D sea-floor seismic data contain all azimuths. The azimuthal directivity of the source array will therefore be present in the data.

In land seismic acquisition, source arrays are usually formed by placing a number of land seismic vibrators in a spatial pattern. The acquisition geometry of a 3D land survey is similar to the sea-floor acquisition geometry as shown in FIG. 5, but with the receiver cables at the earth's surface. Thus, 3D land seismic data are acquired for all azimuths and the azimuthal directivity of the source array is present in the seismic data.

In borehole seismic acquisition, a tool 10 with receivers is located deep (e.g. 1 km) down a drilled well 12 below a rig 14 (see FIGS. 7a and b). The source 4 is located at the surface. Borehole seismic acquisition can be done either at sea or on land. The employed source arrays are usually smaller than in the previously mentioned types of seismic acquisition. A borehole seismic survey is usually called a Vertical Seismic Profile (VSP). An acquisition geometry of a 3D VSP in a vertical well at sea is shown in FIGS. 7a and b. It can be seen that the seismic data are acquired for all azimuths and the azimuthal directivity of the source array 4 will be present in the data. To a lesser degree it can also be present in a 2D VSP.

U.S. Pat. No. 5,142,498 seeks to construct arrays where the phase spectrum for all take-off angles of interest will match the phase spectrum of the vertically downgoing pulse. This is referred to as phase control. Phase control is achieved by symmetrically arranging identical source elements about the array's geometric centroid. The geometric centroid is the centre line in the source array about which the identical source elements are symmetrically arranged. This is the line where phase control is achieved. If all elements are equal, phase control is achieved in all azimuths for a range of take-off angles limited by geometry. However, phase control is only achieved within a limited range of take-off angles, and although the beam pattern is identical within the limited range of take-off angles where phase control is achieved, the beam pattern is not identical outside this limit.

The invention seeks to provide a seismic source array which is azimuth-invariant, in the sense that it emits a seismic wavefield whose change over a selected range azimuths is zero or negligible. Such a source array can then be used in multi-azimuth seismic acquisition.

SUMMARY OF THE INVENTION

According to the invention there is provided a seismic source array as set out in the accompanying claims.

The design of the source array involves the selection of the number of individual sources, their strengths, their signatures, their positions and their firing/emission delays such that the emitted seismic wavefield does not change or changes unperceivably over a selected range of azimuths. The design preferably fulfills geophysical criteria such as desired frequency content and signal strength in the downward direction of the geological target, and operational criteria such as deployability.

The seismic source array of the invention can be used for many applications, including the following:
1. 3D and 2D marine sea-floor acquisition;
2. 3D and 2D marine sea-surface acquisition, including:
   wide-tow streamer acquisition;
   end-on and split-spread acquisition;
3. 3D and 2D land seismic acquisition; and
4. borehole seismic acquisition, both marine and land including:
   2D and 3D walkaway VSP;
   offset VSP.

It should be appreciated that all of the seismic source elements do not necessarily have to be positioned at the same depth. Where the seismic sources are arranged in a number of concentric circles, this can be achieved by putting the circles at different depths. Concentric circles of sources may also be placed directly above or below each other. Where the sources are arranged in concentric circles, each circle preferably contains identical source elements.

To fulfil geophysical criteria on the spectral contents of the total emitted wavefield, it may be necessary to use array elements with different spectral output. It may also be necessary to assign different firing/emission delays to the array elements, particularly if elements are placed at different depths.

The invention is not limited to the specific embodiments described hereinafter. In particular, the invention recognises that perturbations to the symmetry of the geometry of the elements and/or perturbations to the symmetry of the output of the elements can also give all azimuth-invariant source array, provided the perturbations are small.

BRIEF DESCRIPTION OF THE DRAWINGS

Specific embodiments of the invention will now be described, by way of example only, with reference to the accompanying drawings, in which:

FIG. 8 shows a source geometry according to the invention, using fixed azimuth sampling;

FIG. 20 shows energy directivity diagrams at 20, 40, 60 and 90 Hz for the source geometry of FIG. 19, and show the change in azimuth for a fixed apparent velocity ($v_{app}=v/\sin \phi$), where $v$ is the propagation velocity and $\phi$ is the take-off angle.

DETAILED DESCRIPTION OF THE INVENTION

Figure 1:
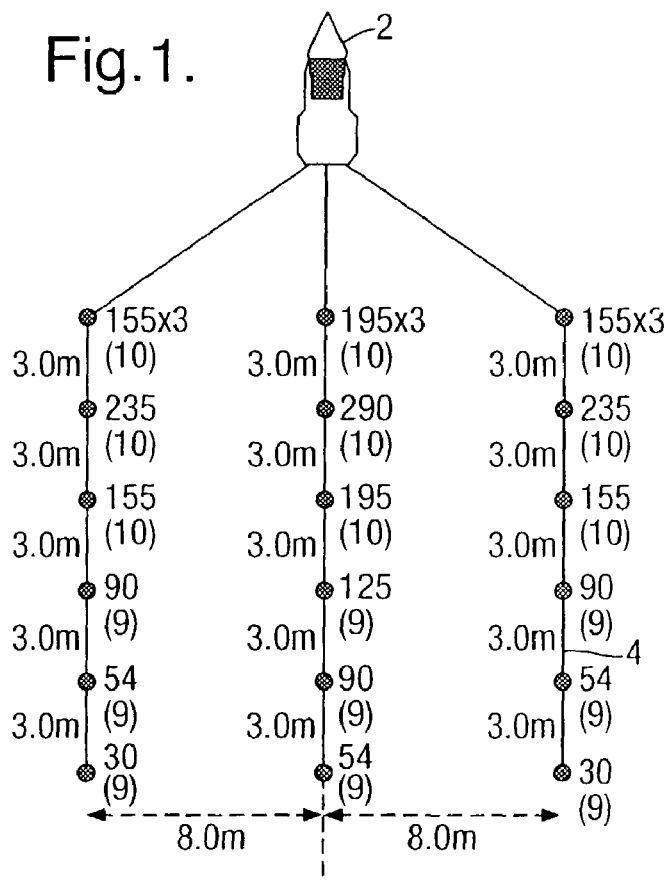
FIG. 1 shows a prior art airgun source array comprising three sub-arrays each comprising five airguns.
Figure 2:
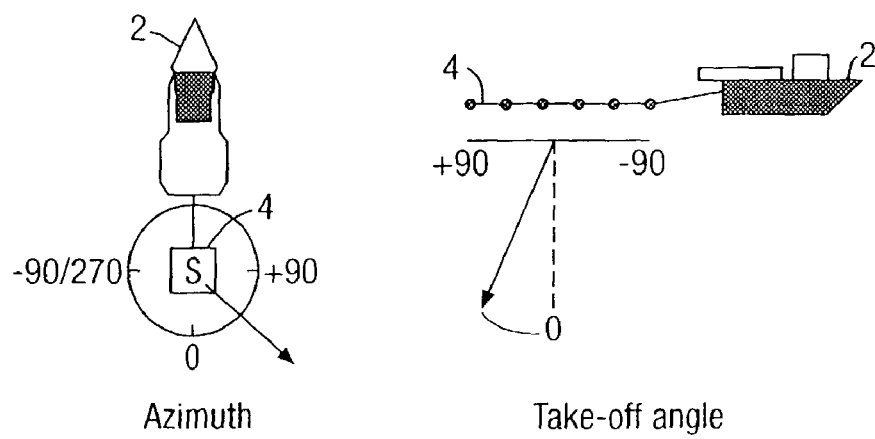
FIG. 2 illustrates the azimuth and take-off angles in a marine source array.
Figure 3:
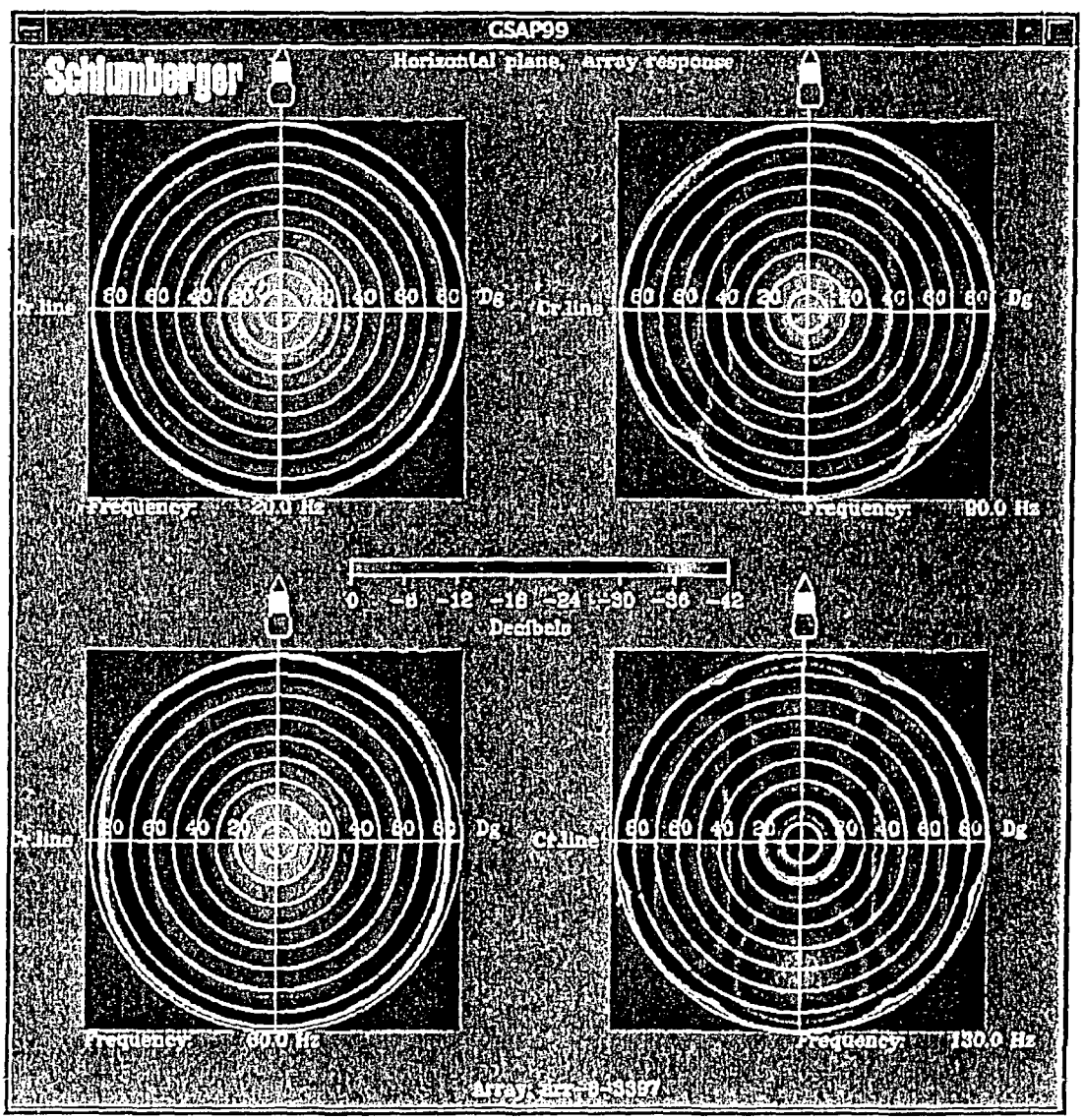
FIG. 3 shows energy directivity diagrams at 20 Hz, 60 Hz, 90 Hz and 130 Hz for the source array of FIG. 1, in which each circle represents a different take-off angle.
Figure 4A:
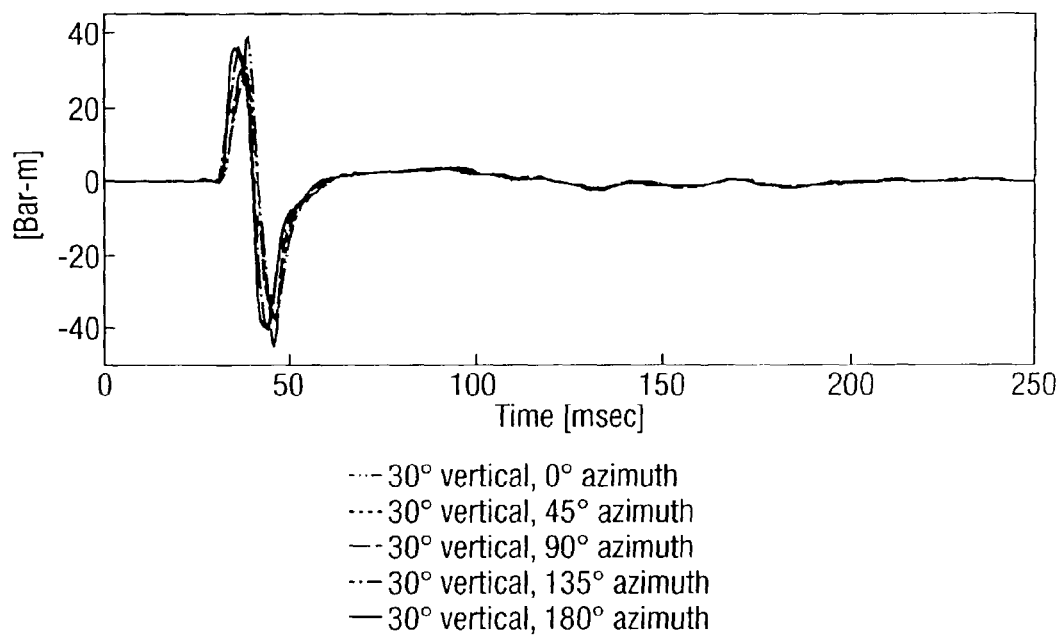
FIGS. 4a, b and c show seismic signatures, amplitude spectra and phase spectra respectively at a take-off angle of 30° for a range of azimuths (0°, 45°, 90°, 135°, 180°) for the source array in FIG. 1.
Figure 4B:
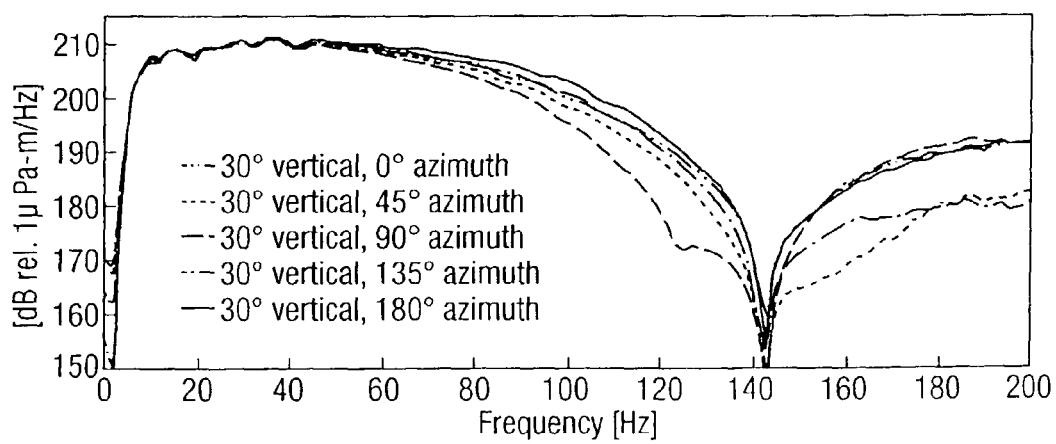
Figure 4C:
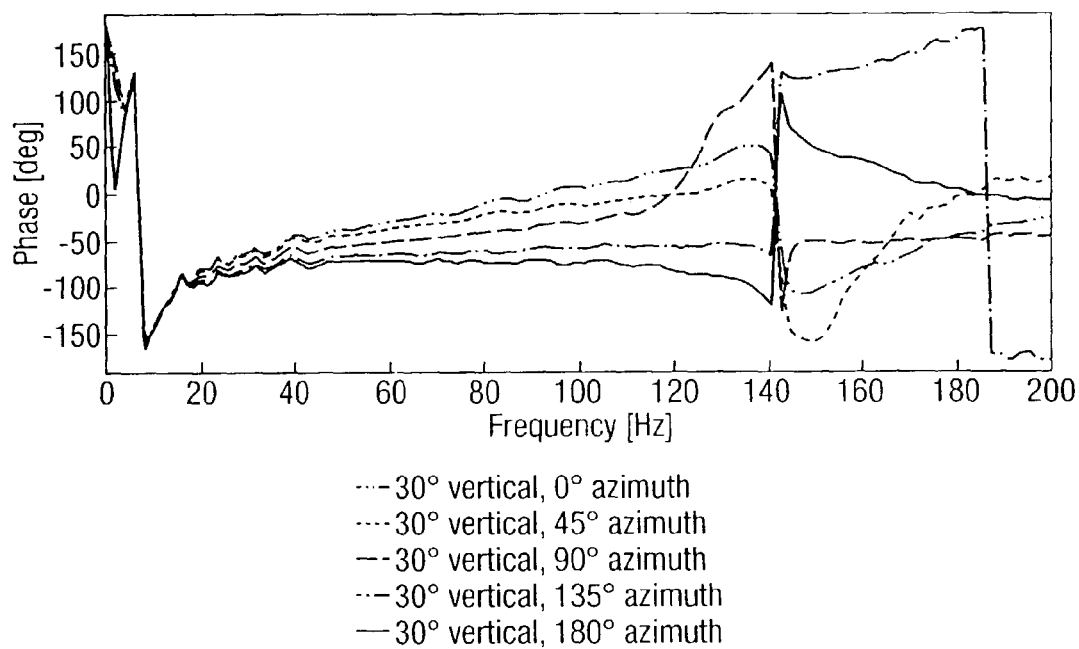
Figure 5:
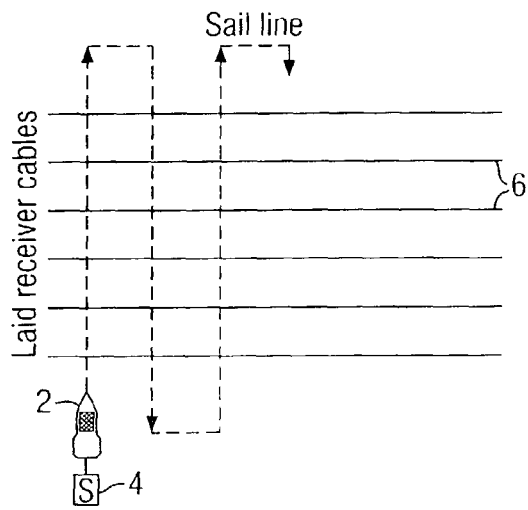
FIG. 5 is a schematic illustration of sea-floor acquisition, in which a vessel tows a source array over receiver cables spread out on the sea floor.
Figure 6:
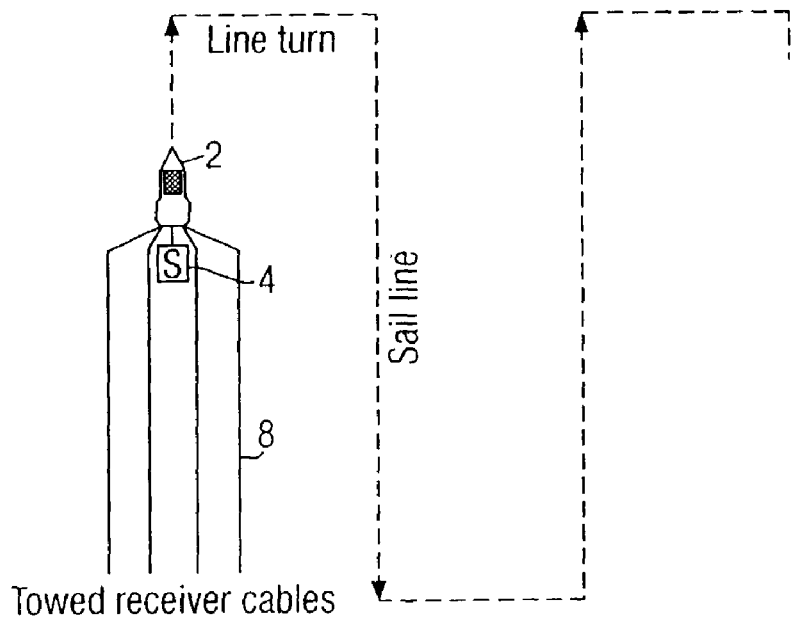
FIG. 6 is a schematic illustration of towed-streamer sea-surface acquisition, in which a vessel tows both a source array and receiver cables close to the sea surface.
Figure 7A:
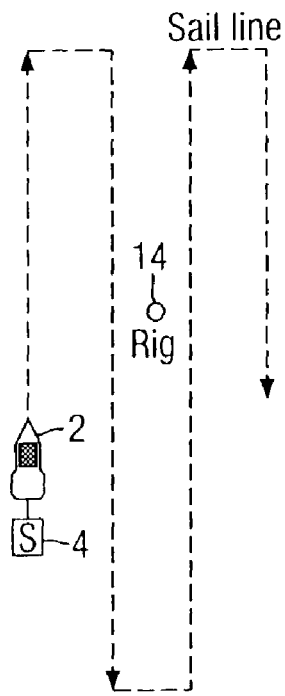
FIG. 7a is a schematic illustration of marine borehole seismic acquisition, in which a vessel tows a source array in the survey area around a rig.
Figure 7B:
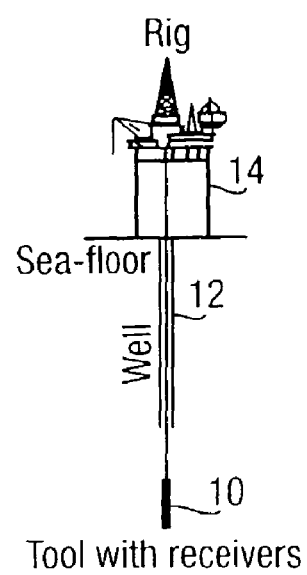
FIG. 7b is a schematic illustration of the rig of FIG. 7a, in which a tool with receivers is suspended from the rig down a well.

FIGS. 1 to 7 have already been described above in relation to the background to the invention.

FIG. 8 shows an example of an azimuth-invariant source geometry for a source array 15. The vessel direction is indicated by arrow 16. Eight sources 18 of type 1 are spaced equally on an outer circle labelled "a", eight sources 20 of type 2 are spaced equally around an inner circle labelled "b", and a single source 22 of type 3 is located at the centre of the array 15. The geometry of the array is the result of a design procedure consisting of the following steps:

1. Select the radius of the outer circle. The outer dimension of the array generally determines the width of spatial main-lobe.
2. Select the angular sampling interval, $\Delta\theta=360°/N$, where N is the number of elements on each circle. E.g. in FIG. 8, $\Delta\theta=45°$. A dense angular sampling will give small variations with azimuth angle.
3. Distribute equal elements regularly over the circle at the same depth.
4. Draw lines through each element parallel to a fixed direction.
5. Determine the number of different source element types, which is less than or equal to the number of different circles. Different source elements may be necessary in order to fulfil spectral constraints on the composite wavefield and/or constraints on the composite signatures.
6. The relationship between the M circles is defined such that for every circle m=1: M−1 do:
   (a) The next circle, #m+1, is defined such that the line next to the outermost line of the current circle, #m, is the tangent of the next circle (#m+1). E.g., line #2 in FIG. 8 is a tangent to circle b and is the line immediately next to the outermost line of circle a.
   (b) Distribute the N elements over circle #m+1 such that one of the elements is placed on the line of circle #m. E.g., one of the elements of circle b is placed on line #2 in FIG. 8.
   (c) Draw lines through each element parallel to the lines in Step 4.
7. An element of the last element type is placed at the centre.

This embodiment is particularly suited for marine acquisition since imaginary parallel lines 24 in FIG. 8 can be defined as subarrays, which makes the array 15 easy to tow. The number of elements per subarray is maximised by Step 6. However, for other applications the design procedure could be more general by omitting this step. The array 15 has rotational symmetry about the centre of the array.

Figure 9:
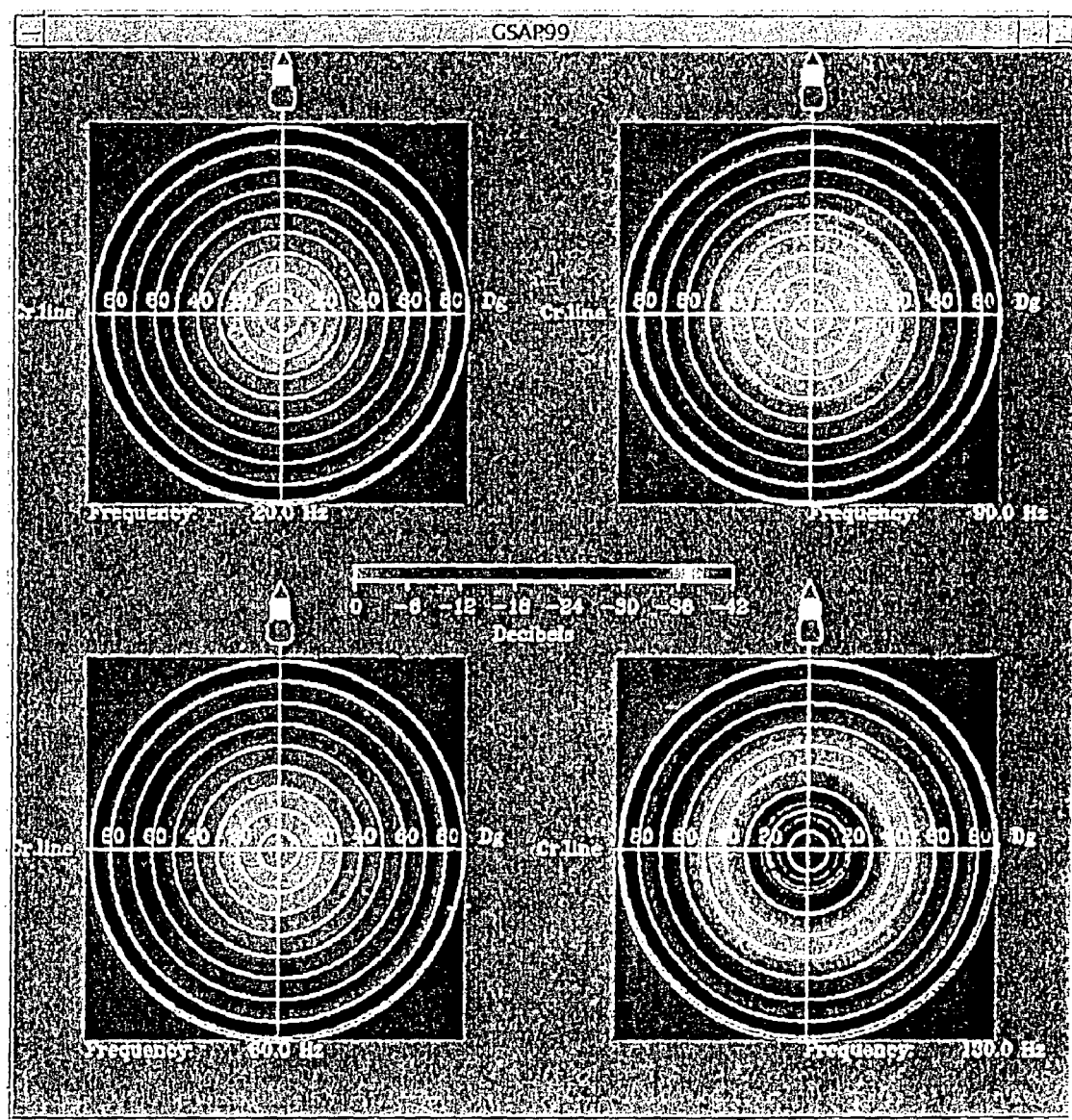
FIG. 9 shows four energy directivity diagrams at 20, 60, 90 and 130 Hz for the source geometry of FIG. 8.

The example in FIG. 8 has 7 subarrays with a total of 17 guns 26 distributed over three types of source elements. The beam pattern of an array with this geometry is shown in FIG. 9. The radius of the outer circle (a) is here 6 m and element type 1 is Bolt 1900LLX 54 in$^3$ airgun, element type 2 is Bolt 1900LLX 3×54 in$^3$ airgun cluster, and element type 3 is Bolt 1500LL 3×235 in$^3$ airgun cluster.

Figure 10A:
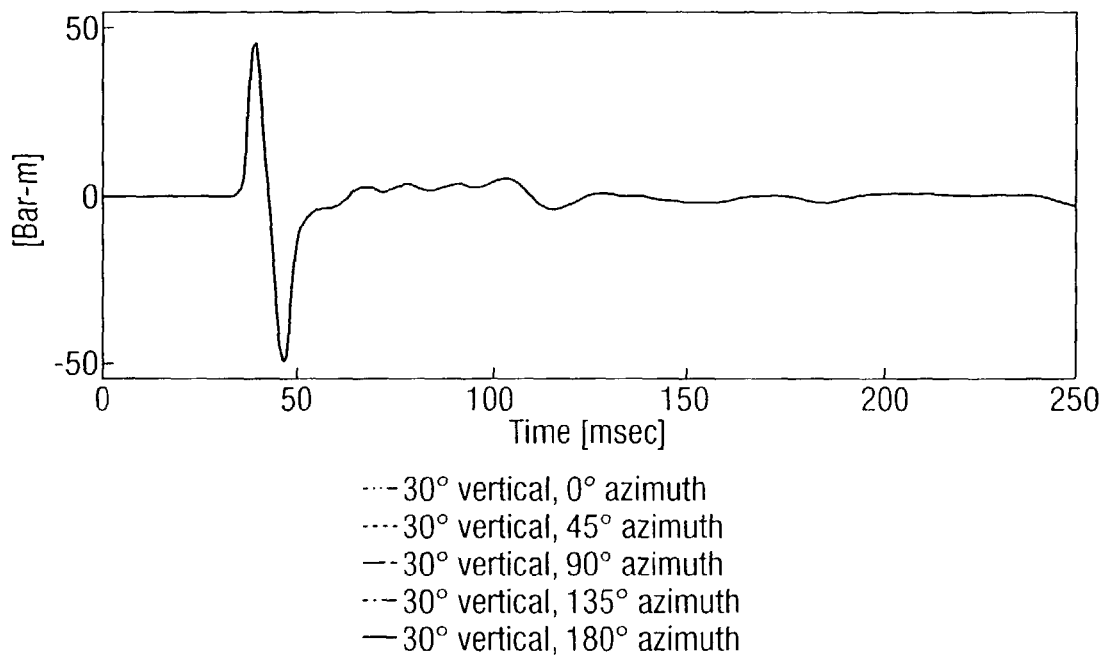
FIGS. 10a, b and c show respectively seismic signatures amplitude spectra and phase spectra for FIG. 8, and illustrate that the seismic signal is substantially the same at all of the displayed azimuths.
Figure 10B:
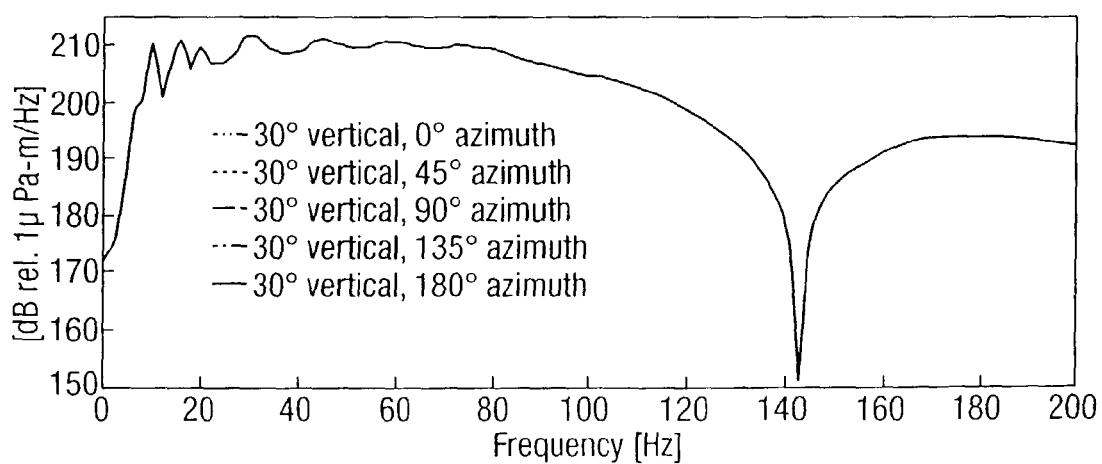
Figure 10C:
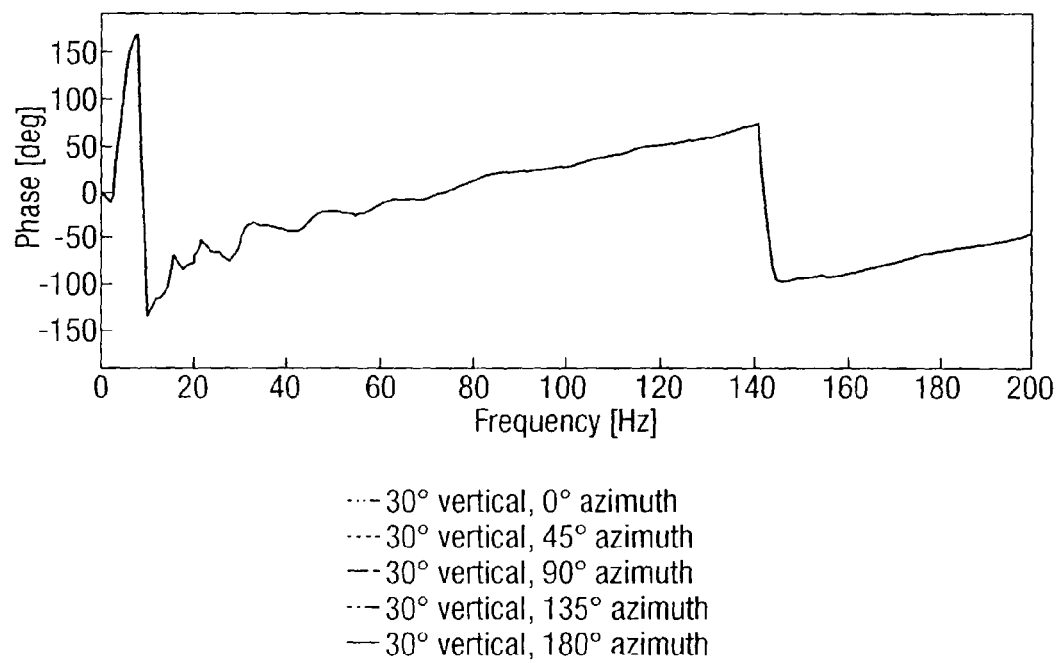

FIGS. 10a, b and c show respectively the seismic signal, its amplitude spectrum and phase spectrum emitted at a takeoff angle of 30° and at a range of azimuths. It can be seen that the seismic signal is the same for all the azimuths.

Figure 11:
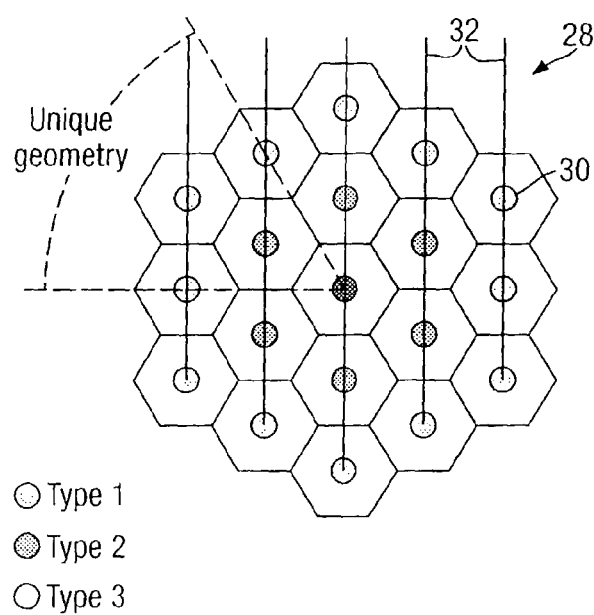
FIG. 11 shows a source geometry in accordance with the invention, using hexagonal sampling.

FIG. 11 shows a further array 28 formed from 19 elements 30 of three types. For arrays with a large aperture it might not be desirable to sample each radius by the same angular step size, which was the case for the embodiment of FIG. 8. By placing the array elements 30 on a hexagonal grid, as shown in FIG. 11, one obtains an array configuration that samples a large radius denser than a small radius. Here, the unique geometry is defined within a sector of 60°. In addition the array elements line up (see imaginary parallel lines 32), which makes the array easy to tow in marine acquisition.

Figure 12:
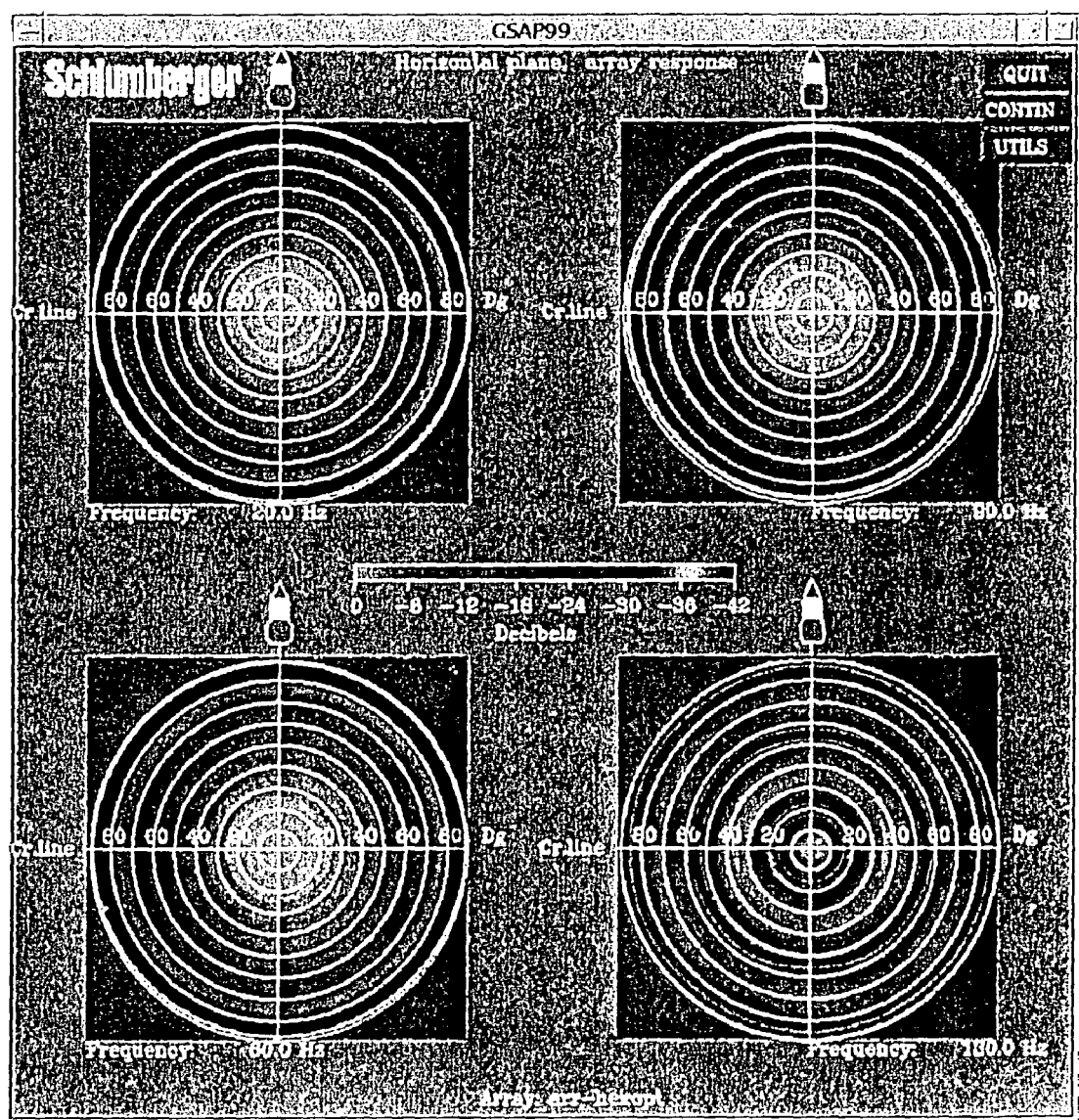
FIG. 12 shows four energy directivity diagrams at 20, 60, 90 and 130 Hz for the source geometry of FIG. 11.

The farfield beam pattern of a realisation of this array 28 is given in FIG. 12, where the sides in each of the hexagons are 2 m. Element type 1 is Bolt 1900LLX 2×54 in$^3$ airgun cluster, element type 2 is Bolt 1900LLX 54 in$^3$ airgun and element type 3 is Bolt 1900LLX 30 in$^3$ airgun. The resulting beam pattern is azimuth-invariant in the seismic frequency range.

Figure 13A:
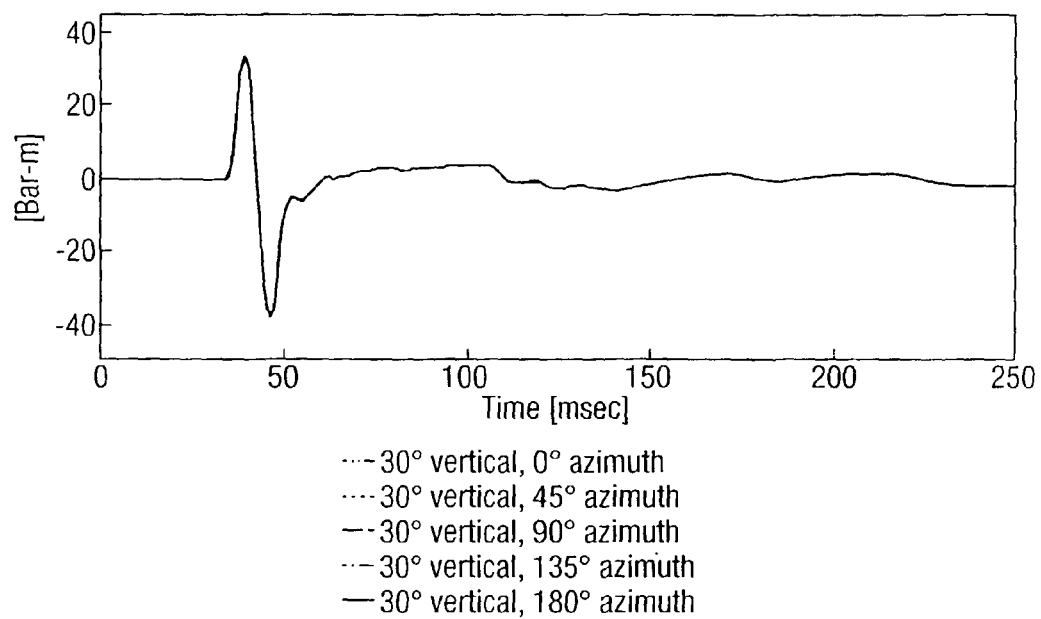
FIGS. 13a, b, and c show respectively seismic signatures, amplitude spectra and phase spectra for the source array of FIG. 11, and show that the seismic signal is the same at all of the displayed azimuths up to 180 Hz.
Figure 13B:
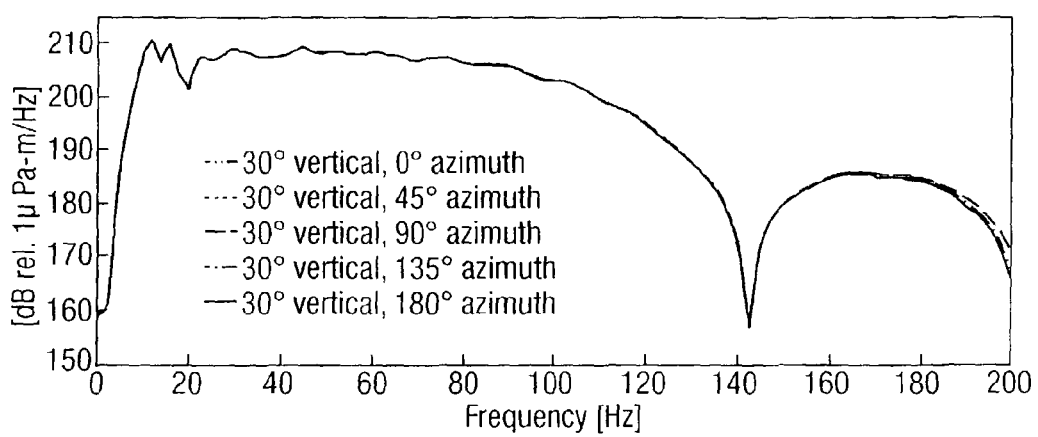

FIGS. 13a, b and c show respectively the seismic signal, its amplitude and phase spectrum emitted at a take-off angle of 30° and at a range of azimuths. It can be seen that the seismic signal is the same for all the azimuths for frequencies up to 180 Hz.

Typically, a source array consists of three subarrays. The geometry in FIG. 11, with the 12 outer elements of type 1 removed, only needs three subarrays (7 elements in total) and is therefore a particularly practical embodiment. Element type 2 is now Bolt 1500LL 3×235 in$^3$ airgun cluster and element type 3 is now Bolt 1900LLX 3×125 in$^3$ airgun cluster.

Figure 14:
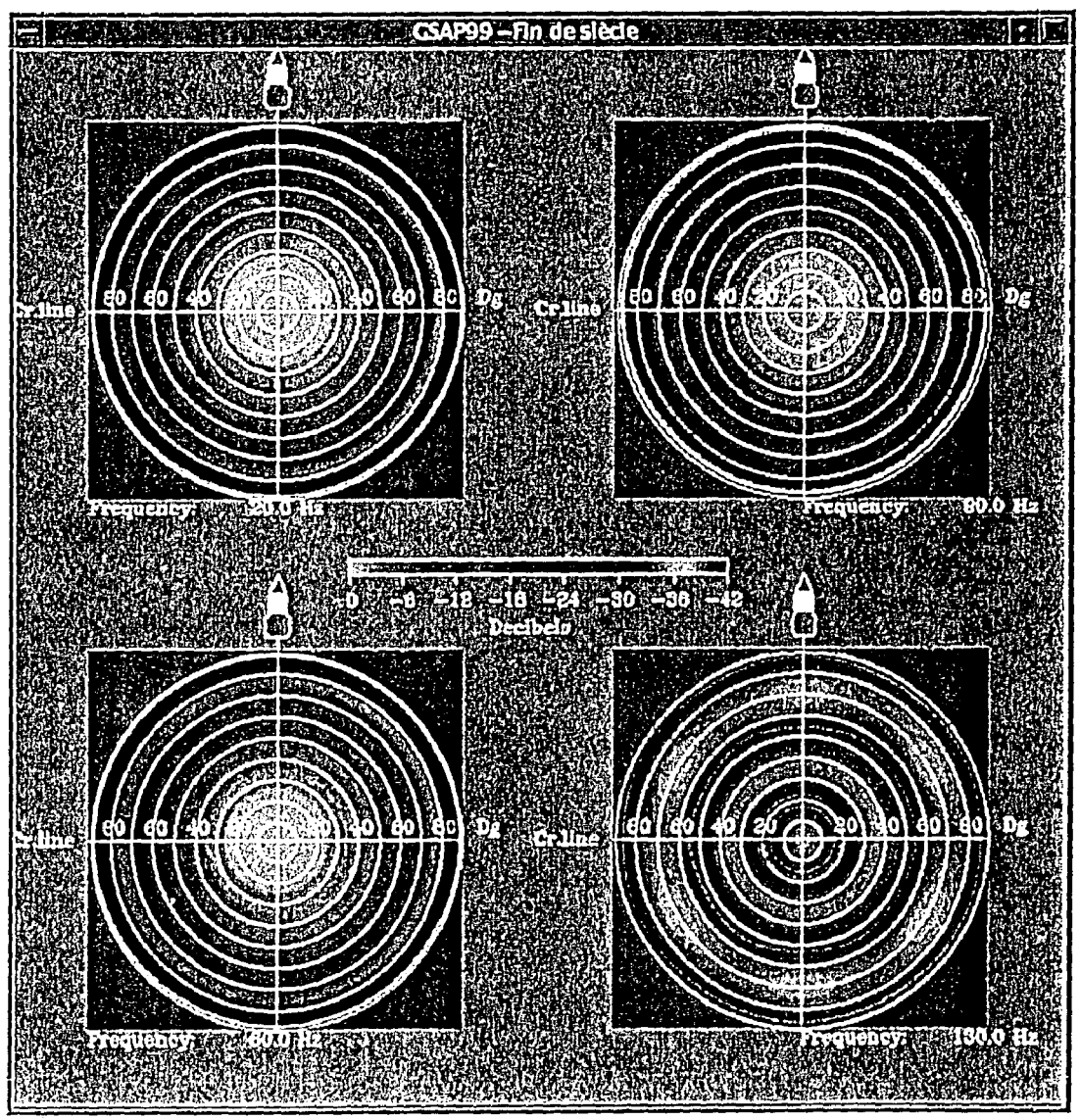
FIG. 14 shows four energy directivity diagrams at 20, 60, 90 and 130 Hz for a source geometry based on FIG. 11, but using only three sub-arrays.

The farfield beam pattern of a realisation of such a 7 element array is given in FIG. 14, where the sides in each of the hexagons are 3.5 m. The resulting beam pattern is azimuth-invariant for frequencies up to 130 Hz and for take-off angles up to 60°.

Figure 15A:
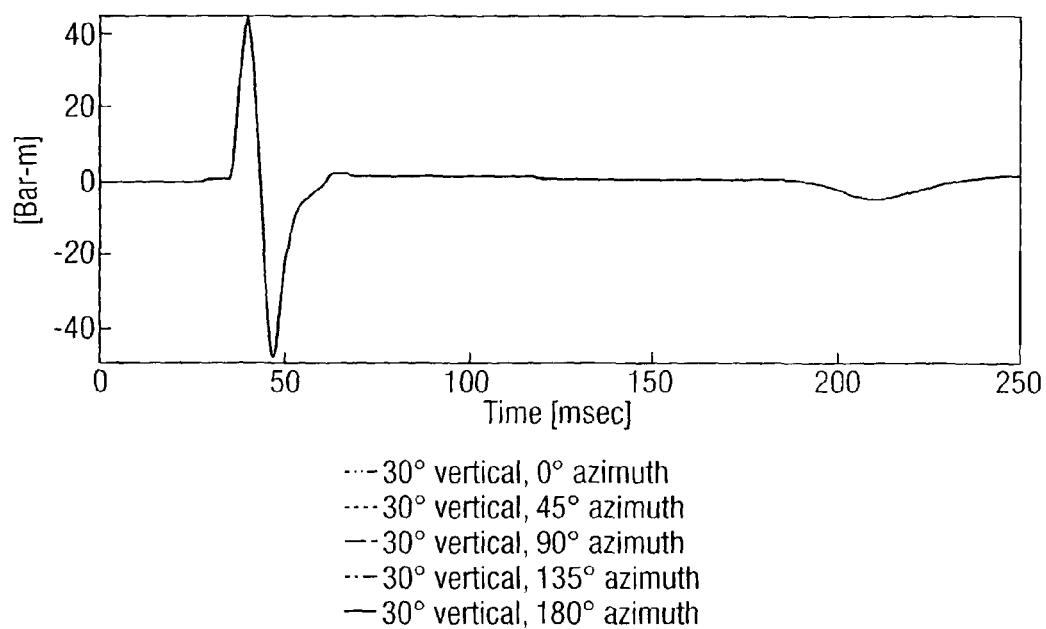
FIGS. 15a, b and c show seismic signatures amplitude spectra and phase spectra for the geometry used for FIG. 14, and show that the seismic signal is the same at all of the displayed azimuths up to 180 Hz.
Figure 15B:
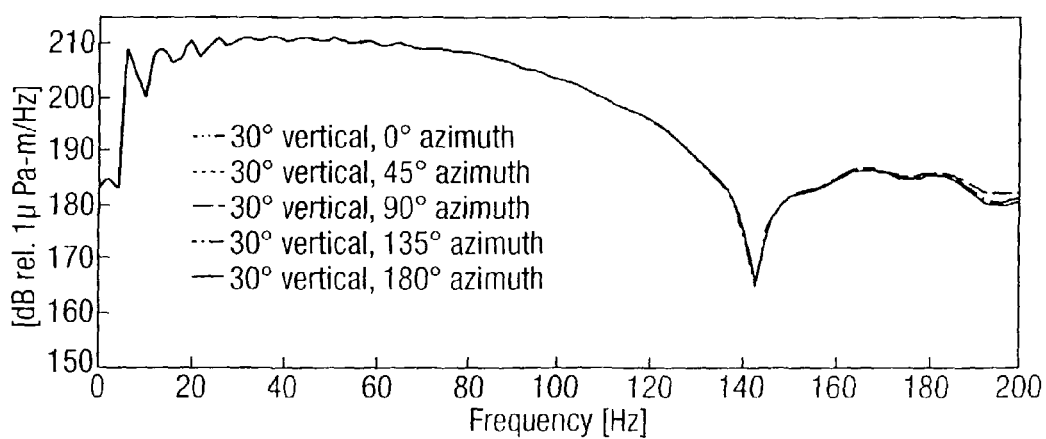
Figure 15C:
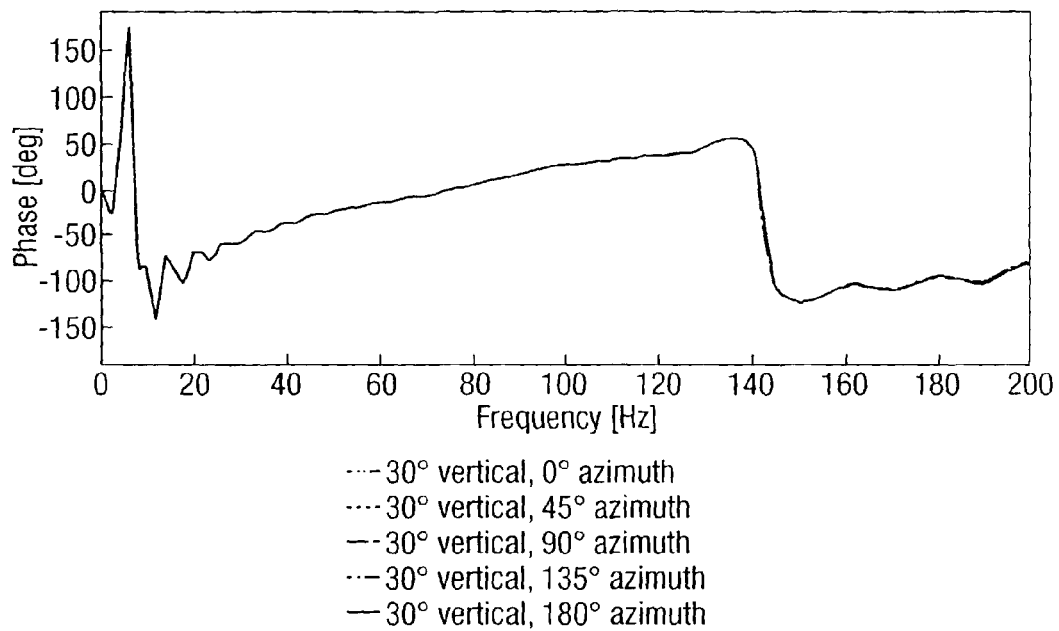

FIGS. 15a, b and c show the seismic signal, its amplitude and phase spectrum emitted at a take-off angle of 30° and at a range of azimuths for such a 7 element array. It can be seen that the seismic signal is the same for all the azimuths for frequencies up to 180 Hz.

Figure 16:
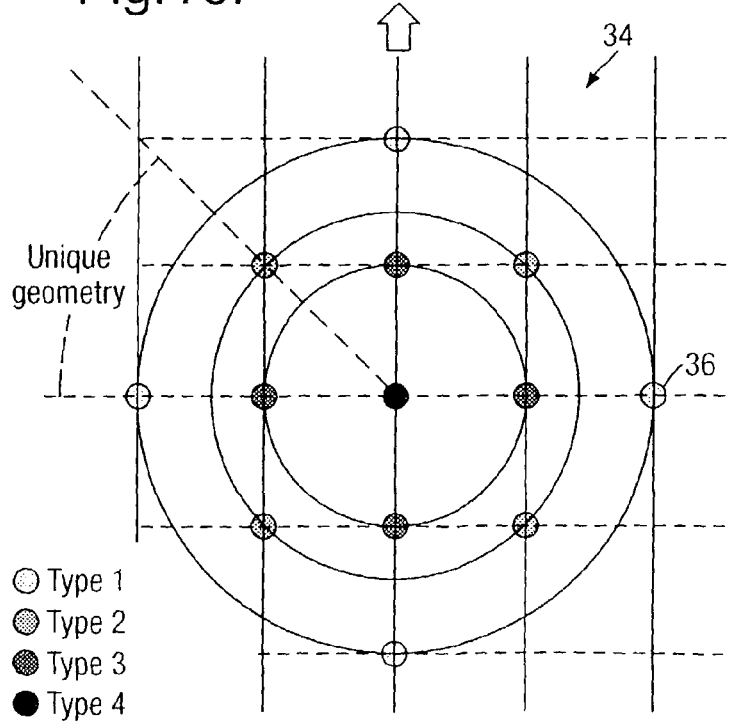
FIG. 16 shows a source geometry according to the invention, with equal spatial sampling in-line and cross-line.

FIG. 16 shows a perturbation of an azimuth-invariant geometry that still renders an azimuth-invariant source within the definition of the invention. An array 34 comprises 13 elements (guns) 36 of four different types. The number of guns in the array equals the number of grid nodes inside the circle of the outermost elements. The unique geometry is defined by an octant of the circular disk, such that the other positions are given by symmetry.

The geometry described here and the geometries of FIGS. 8 and 11 are different in the way they approximate a circular disk. In FIG. 8 the disk was sampled regularly in azimuth and irregularly in the radial direction. With the hexagonal geometry of FIG. 11 the disk was sampled irregularly both in azimuth and in the radial direction. The geometry of FIG. 16 also samples the disk irregularly both in azimuth and in the radial direction.

Figure 17:
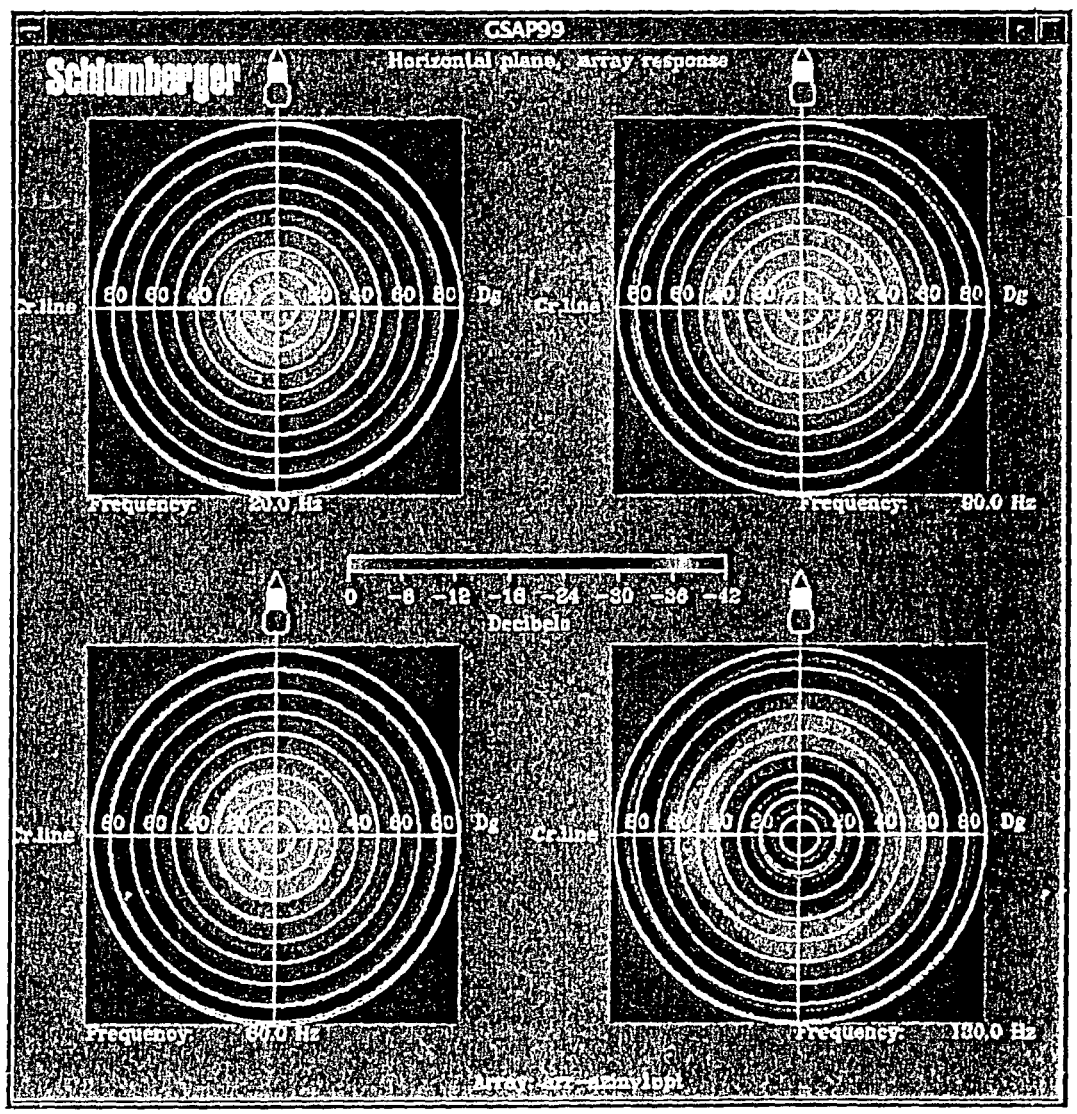
FIG. 17 shows four energy directivity diagrams at 20, 60, 90 and 130 Hz for the source geometry of FIG. 16.

The farfield beam pattern of a realisation of the array 34 of FIG. 16 is given in FIG. 17, where the element separation is 3 m both in-line and cross-line. Element type 1 is Bolt 1500LL 195 in$^3$ airgun, element type 2 is Bolt 1500LL 2×1 55 in$^3$ airgun cluster, element type 3 is Bolt 1500LL 3×235 in$^3$ airgun cluster and element type 4 is Bolt 1900LLX 125 in$^3$ airgun. This beam pattern is azimuth-invariant for all take-off angles up to 100 Hz.

Figure 18A:
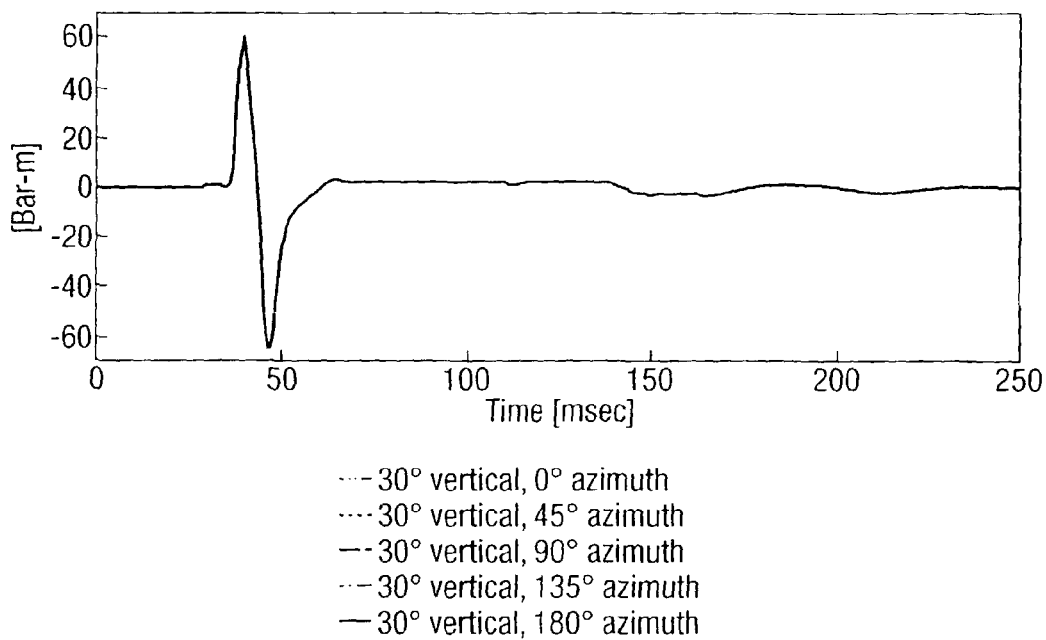
FIGS. 18a, b and c show seismic signatures, amplitude spectra and phase spectra for the source array of FIG. 16, and show that the seismic signal is the same at all of the displayed azimuths up to 160 Hz.
Figure 18B:
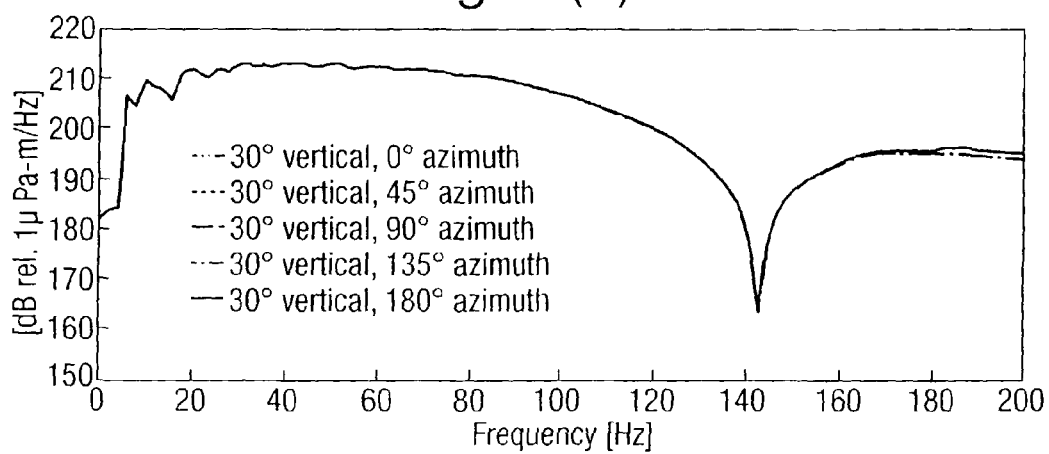
Figure 18C:
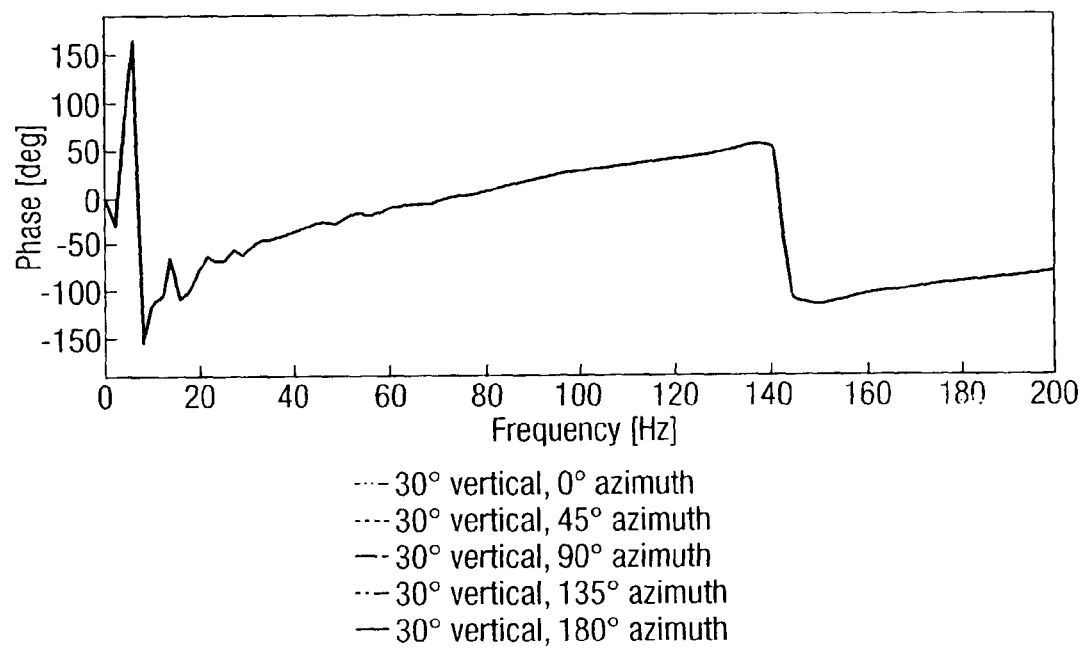

FIGS. 18a, b and c show respectively the seismic signal, its amplitude and phase spectrum emitted at a take-off angle of 30° and at a range of azimuths. It can be seen that the seismic signal is the same for all the azimuths for frequencies up to 160 Hz.

Figure 19:
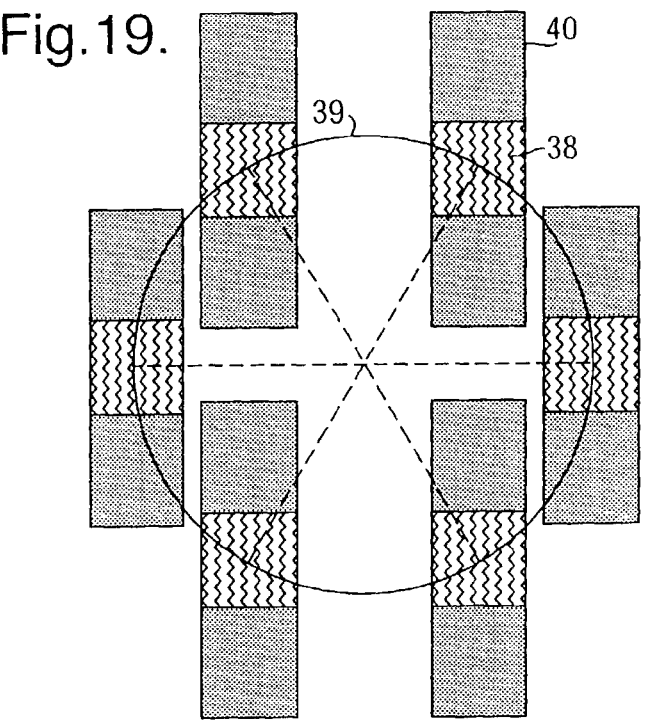
FIG. 19 shows a source geometry according to the invention using six vibrator trucks distributed uniformly on a circle.

The hexagonal embodiment of FIG. 11 can be applied for vibrator arrays in land seismic acquisition. A number of vibrators 38, in this case six, are distributed uniformly on a circle 39 as shown in FIG. 19. The lower bound for the radius of the circle is determined by the outer dimensions of the vibrator trucks 40. In FIG. 19 the outer dimensions of the trucks 40 are width 3 m by length 10 m. The radius of the circle is 7 m.

On land, a seismic source generates elastic waves with different propagation velocities. These propagation velocities can be very different from one survey location to another. The farfield beam pattern is therefore not expressed in terms of azimuth and take-off angle but in terms of azimuth and apparent velocity.

$$v_{app} = \frac{v}{\sin\phi}$$

where v is the propagation velocity and φ is the take-off angle.

The equivalent of the farfield beam patterns in the previous sections is to use the approximate propagation velocity of sound in water: v=1500 m/s. In land acquisition, useful reflection data can have apparent velocities from ∞ down to about 1500 m/s. Strong coherent noise, known as groundroll, is commonly present. Groundroll travels along the earth's surface so it has a take-off angle of ±90°. Its propagation velocity is low: usually between 1000 m/s and 100 m/s. Groundroll is low frequent; its bandwidth does usually not extend beyond 40 Hz.

The farfield beam pattern of the array in FIG. 19 is given in FIG. 20. All vibrators 38 generate the same 6-90 Hz sweep. The circles in the diagram show the change in azimuth for a fixed apparent velocity. It can be seen that for reflection data, with apparent velocities that are higher than 1500 m/s, the source array is azimuth-invariant down to 200 m/s at 20 Hz. At 40 Hz, the source array is azimuth-invariant for groundroll down to 500 m/s.

The invention claimed is:

1. A seismic source array comprising a plurality of seismic sources arranged about a central point of the source array occupied by one of the seismic sources in such a way that an imaginary circle drawn with said central point at its centre, and containing all of said seismic sources, can be divided into at least three whole sectors each of which contains a substantially identical arrangement of seismic sources to emit an azimuth-invariant seismic wavefield.

2. A seismic source array as claimed in claim 1, wherein the azimuth-invariant seismic wavefield manifests negligible change over a selected range of azimuths.

3. A seismic source array as claimed in claim 1, wherein seismic sources of at least two different powers are used within the array.

4. A seismic source array as claimed in claim 1, wherein at least some of the seismic sources in the source array are placed at different depths.

5. A seismic source array as claimed in claim 4, wherein in use firing, emission, or both firing and emission delays are introduced between at least some of the seismic sources.

6. A seismic source array as claimed in claim 1, wherein the seismic sources are arranged in concentric circles and wherein the seismic sources of each concentric circle emit a wavefield with substantially the same signature.

7. A seismic source array as claimed in claim 6, wherein at least some of the concentric circles of seismic sources are placed at different depths.

8. A seismic source array as claimed 7, wherein at least some of the concentric circles of seismic sources at different depths have substantially the same radius, and thus lie directly above or below each other.

9. A seismic source array as claimed in claim 6, wherein all seismic sources in the array are also arranged along a plurality of imaginary parallel lines passing through the array and wherein each circle is located between, and tangential with, a pair of said imaginary parallel lines.

10. A seismic source array as claimed in claim 6, wherein a different type, a different power, or a different type and a different power of seismic source is used for each circle.

11. A seismic source array as claimed in claim 2, wherein the negligible change is a zero change.

12. A seismic source array as claimed in claim 1 for use in marine seismic acquisition.

13. A seismic source array as claimed in claim 1 for use in sea-floor seismic acquisition.

14. A seismic source array as claimed in claim 1 for use in borehole seismic acquisition.

15. A seismic source array as claimed in claim 1 for use in towed-streamer end-on and split-spread seismic acquisition.

16. A seismic source array as claimed in claim 1 for use in land seismic acquisition.

17. A seismic source array as claimed in claim 6, wherein the signatures of the wavefields emitted from the concentric rings vary from one another in their spectral densities.

18. A seismic source array as claimed in claim 1, wherein the positions of the seismic sources have rotational symmetry in azimuth.

19. A seismic source array as claimed in claim 1, wherein the rotational symmetry in azimuth is of order three or greater in the horizontal plane.

20. A method for use in seismic surveying, comprising:
deploying a source array about a central point occupied by one of the seismic sources in such a way that an imaginary circle drawn with said central point at its centre, and containing all of said seismic sources, can be divided into at least three whole sectors each of which contains a substantially identical arrangement of seismic sources; and
emitting an azimuth invariant seismic wavefield from the deployed source array.

21. The method of claim 20, wherein the azimuth-invariant seismic wavefield manifests negligible change over a selected range of azimuths.

22. The method of claim 20, wherein:
deploying the seismic source array includes arranging the seismic sources in concentric circles; and
the seismic sources of each concentric circle emit a wavefield with substantially the same signature.

23. The method of claim 22, wherein at least some of the concentric circles of seismic sources are placed at different depths.

24. The method of claim 22, wherein at least some of the concentric circles of seismic sources at different depths have substantially the same radius, and thus lie directly above or below each other.

25. A seismic source array as claimed in claim 24, wherein a different type, a different power, or a different type and a different power of seismic source is used for each circle.

26. The method of claim 20, wherein the positions of the seismic sources have rotational symmetry in azimuth.

27. The method of claim 26, wherein the rotational symmetry in azimuth is of order three or greater in the horizontal plane.

28. The method of claim 20, wherein the seismic source array is deployed for a land-based survey.

29. The method of claim 20, wherein seismic sources of at least two different powers are used within the array.

30. The method of claim 20, wherein at least some of the seismic sources in the source array are deployed at different depths.

31. The method of claim 27, wherein emitting the azimuth-invariant seismic wavefield includes introducing firing, emission, or both firing and emission delays between at least some of the seismic sources.

32. The method of claim 20, wherein deploying the seismic source array comprises deploying the seismic source array for use in marine seismic acquisition.

33. The method of claim 32, wherein deploying the seismic source array comprises deploying the seismic source array for use in sea-floor seismic acquisition.

34. The method of claim 32, wherein deploying the seismic source array comprises deploying the seismic source array for use in towed-streamer acquisition.

35. The method of claim 34 wherein deploying the seismic source array comprises deploying the seismic source array for use in towed-streamer end-on and split-spread seismic acquisition.

36. The method of claim 20 wherein deploying the seismic source array comprises deploying the seismic source array for use in borehole seismic acquisition.

37. The method of claim 20 wherein deploying the seismic source array comprises deploying the seismic source array for use in land seismic acquisition.

* * * * *